Aug. 28, 1962  D. C. DURGIN ET AL  3,051,385
CRAWL CARRY MECHANISM
Filed Nov. 7, 1960  3 Sheets-Sheet 1

INVENTORS
DOUGLAS C. DURGIN
JAMES W. DODSWORTH
BY
*Elmer W. Edwards*

AGENT

Aug. 28, 1962  D. C. DURGIN ET AL  3,051,385
CRAWL CARRY MECHANISM
Filed Nov. 7, 1960  3 Sheets-Sheet 2

INVENTORS
DOUGLAS C. DURGIN
JAMES W. DODSWORTH
BY *Elmer W. Edwards*

AGENT

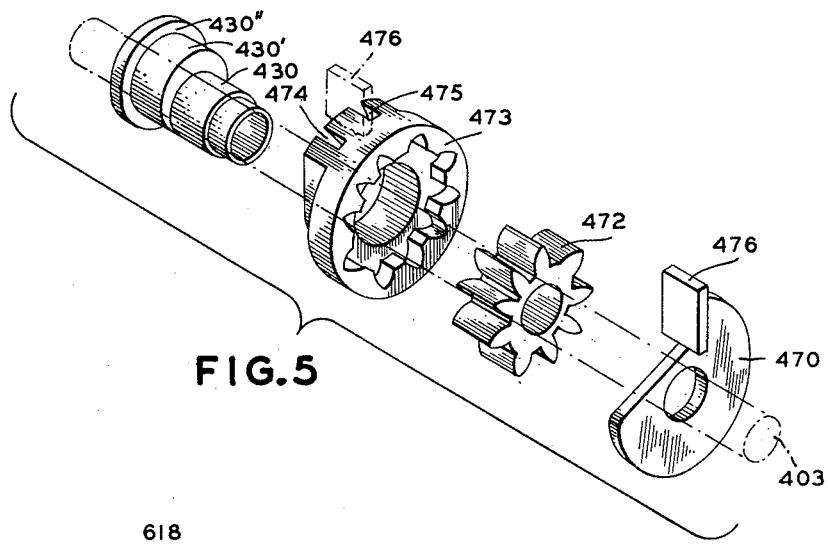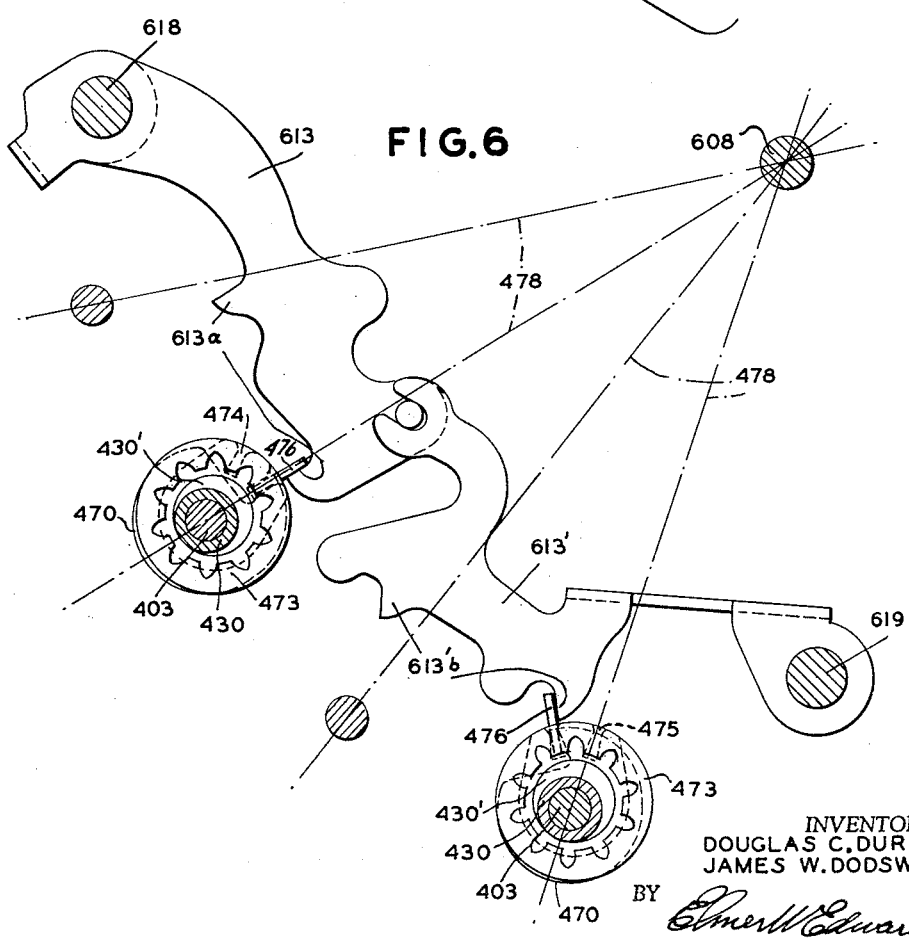

United States Patent Office 3,051,385
Patented Aug. 28, 1962

3,051,385
CRAWL CARRY MECHANISM
Douglas C. Durgin, West Orange, and James W. Dodsworth, Mount Tabor, N.J., assignors to Monroe Calculating Machine Company, Orange, N.J., a corporation of Delaware
Filed Nov. 7, 1960, Ser. No. 67,675
7 Claims. (Cl. 235—136)

The invention relates to calculating machines, and particularly to improvements in the value registers therefor employing a tens transfer of the "crawl" carry type, described in U.S. Patent No. 2,450,787 issued October 5, 1958 to Howard M. Fleming.

In said patent each accumulaotr wheel of a register includes an internal gear which is riveted to a flanged plate acting as a hub for the gear and mounted for rotation upon an eccentric portion of a bushing or hub, which in turn is mounted for rotation upon a register support shaft. Each one of said plates includes also a stop lug for rotation therewith on the said eccentric. Such construction requires not only extra parts to be made but also increases the weight and over-all size of the accumulator wheels to provide necessary stock for the riveting operations.

Mounting of the accumulator wheel stop lugs upon eccentrically operable members is objectionable in that displacement of the pivotal center of rotation for said lugs to different positions around the support shaft, as occurs in a tens carry operation, precludes an accurate uniform alignment of the lugs with respect to the usual pivoted zero limit stop control members which cooperate therewith. Said zero limit stop members being the known hook-shaped projections or total hooks which are sequentially displaced for successive engagement with the zero lugs of the accumulator wheels of any selected active one of the registers, so as to stop rotation thereof at zero registering position during total taking operations, as fully set forth in the patents of reference. Also, heretofore lost motion has occurred at the point of coupling the higher order eccentric with an adjacent lower order accumulator wheel supporting the zero stop lug.

Upon a concentric portion of the above eccentric bushing is mounted an actuator gear which meshes with the internal teeth of the accumulator wheel gear and it has been found that in the above riveting operations the accumulator wheel may be misaligned in a slightly off-center relation to its flanged support plate and so cause a bind to occur between the gear teeth of said wheel and the related actuator gear. Heretofore in making allowance for this possibility a loose mesh is provided between the respective gear teeth but this however makes for a loss motion in the parts. Such loss motion is accumulative over a series of accumulator wheels with the result that again an eccentric of the higher order wheels may be rotatively displaced a sufficient extent whereby the stop lug on the accumulator wheel will not be properly aligned for cooperation with the corresponding projections on the total hooks.

Accordingly, under the above set forth conditions, if any accumulator wheel is already at its zero position, upon a total taking a misalignment is apt to occur in the parts and the total hook may miss engagement with a stop lug, which would cause the numeral wheel to make a complete rotation and thus effect an incorrect registration.

Where a number of registers are required for operation by the known actuator rack segments in common therewith the total hooks are usually formed in the manner of a two-part or compound lever each having an independent pivot center, thus reducing over-all movement of the limit stop members.

In an effort to improve angular cooperation between the limit stops on the total hook levers with the stop lugs on the particular registers associated with each said levers, the stop lugs on the register wheels related to one total hook lever are in a different position on the circumference thereof to the lugs on the wheels associated with the other one of the total hook levers. This incurred the need for separate work fixtures in the manufacturing of one group of registers to the work fixtures required with respect to the riveting operations for other groups of registers. Also, the parts for the different register units are not therefore interchangeable and so are subject to being misassembled.

An object of the present invention therefore is to obviate such disadvantages pertaining to crawl carry registers having accumulator wheels mounted for rotation upon related rotatable eccentric bearings, by providing for said registers concentrically rotatable coupling means adapted for operating the rotatable eccentric bearing for the adjacent higher order accumulator wheel from an adjacent lower order wheel.

Another object of the invention provides zero stop means which have a concentric rotation while operating from an accumulator wheel mounted for operation upon a rotatable eccentric bearing operable by a next adjacent accumulator wheel.

A further object of the invention resides in the arrangement for obtaining more accurate control by securing a zero stop lug for a lower order accumulator wheel to the eccentric bearing supporting an adjacent higher order accumulator wheel and thereby eliminating an undesirable lost motion within the parts.

A still further object provides for said zero stop to serve also as a coupling means between an accumulator wheel and the eccentric bearing for the adjacent higher order wheel.

As a further object the invention provides means whereby the accumulator wheels are adapted for selective engagement with coupling means having alternative set positions with respect to the eccentric bearing members.

Another object of the invention provides accumulator wheels which are adapted to be interchangeable with each other in an assembly of parts effecting cooperation therewith with coupling means associated therewith and which have selective alternative set positions relative to the accumulator wheel.

As another object the invention provides for an improved crawl carry tens transfer register having less loss motion of the parts, of more simple construction, smaller in size, lighter of weight and more economical of manufacture, in that fewer tooling fixtures are required than heretofore.

The above and other objects, features and advantages of the present invention will be more fully understood from the following detailed description when considered in connection with the accompanying drawings in which:

FIG. 5 is an exploded perspective view of the parts of one accumulator unit arranged in the order of their assembly.

FIG. 6 is a detail view illustrating the manner of cooperation of the zero stop lugs on the different registers with the limit stops on their respective total hook levers in zeroizing any selected register during a total taking operation.

Figure 1:
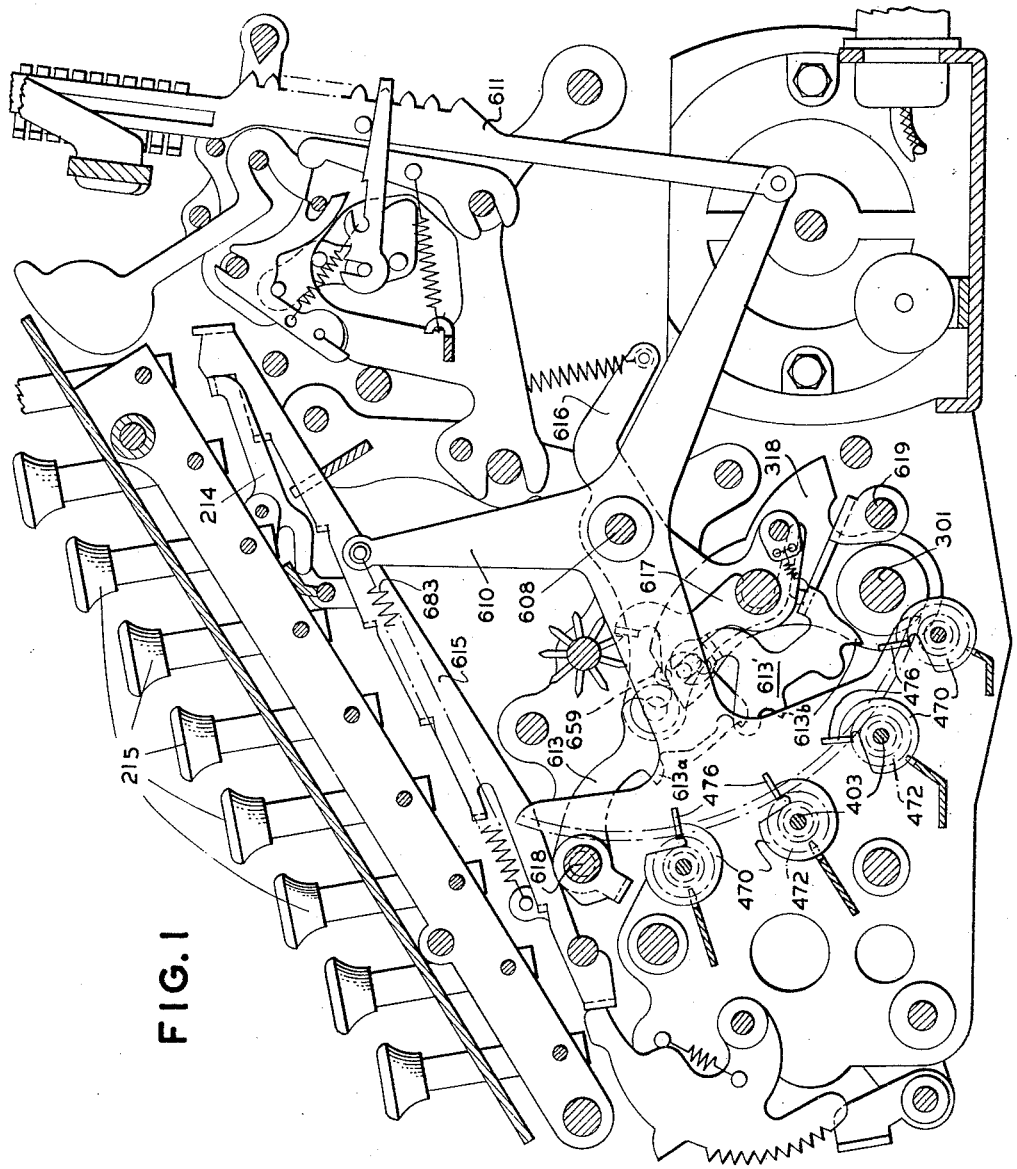
FIG. 1 is a vertical front to rear section of a machine having the invention applied thereto and showing principally the relationship of the actuators and accumulator registers.

The principle of "crawl" tens transfer effected by a train of orbital gearing of the kind termed "entocyclic" are well known to those skilled in the art and is fully set forth in the U.S. patent to Gardner No. 1,828,180 dated October 20, 1931, and as modified by the disclosure of the above noted Fleming Patent No. 2,450,787. The patent to Crosman No. 1,932,013 is also referred to for a disclosure of the machine for which this invention is designed to be used.

In comparing this invention with that of the above reference patents, the action and cooperation of the parts will be set forth herein using corresponding reference numerals for corresponding parts, with certain exceptions.

With reference to FIG. 1, each denominational order of the machine is provided with a three-armed actuator lever 610, these levers being fulcrumed on a shaft 608. The forward arm of each lever 610 terminates in a segmental registering rack, the rearward arm has a listing type bar 611 pivoted thereto and the upper arm has pivotal connection with a differential stop bar 615 cooperating with a bank of digital keys 215 to limit the movement of the lever 610. The digital keys 215 which have been depressed to represent a value, are latched in position with the bottom of their stems lying in the path of movement of the related stop lugs of the bars 615, allowing such bars to advance a distance proportional to the value of the key, upon operation of the machine. Depression of a digital key will also remove a column latch 214 from the path of movement of its related bar 615, these latches preventing movement of a stop bar and lever 610 in any column in which no key is depressed.

A rock shaft 301 is provided with cam means 318 for governing the movement of a spring-tensioned rocker frame 616, carrying a series of dogs 617 normally engaged by studs 659 of the levers 610. As shaft 301 is rotated counterclockwise in a forward stroke of machine operation, frame 616 will be rocked, and any of the levers 610 which have been released by the depression of digital keys will be allowed to rotate under the influence of their spring 683 until they are stopped by the lugs of bar 615 contacting with the stems of the keys. Upon rearward return rotation of shaft 301, the dogs 617 will return the operated levers 610 to normal position. This excursion of the levers 610 serves to register amounts set in the keyboard upon one or more accumulator or totalizer wheels and to set up a similar amount on the printing line of the type bars.

There is provided for the machine of the present disclosure four register units selectively engageable with their common actuator rack levers 610. Each register unit includes a shaft 403 having mounted thereon with respect to each denominational order of the machine an accumulator unit comprising the following parts, as best seen with reference to FIG. 5:

A hub 430 upon which a nine tooth pinion or actuator gear 472 is rotatably mounted, said hub having at one end thereof an eccentric 430' provided with a flanged end portion 430"; a floating totalizer wheel 473 for rotation upon said eccentrics and having ten internal gear teeth for meshing with the nine tooth pinion 472; and a disc 470 spun fast upon a shoulder of the concentric portion of hub 430 said disc together with flange 430" serving to retain pinion gear 472 and wheel 473 for operation upon the concentric and eccentric portions respectively of said hub.

Figure 2:
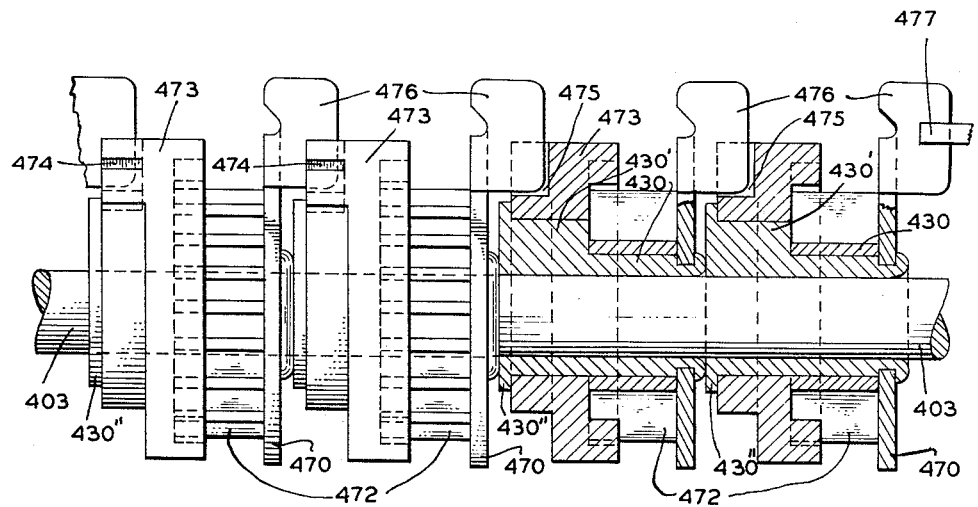
FIG. 2 is an enlarged front view of a portion of a register unit, with the two right side accumulator wheels shown in section as viewed along line 3—3 of FIG. 3.
Figure 3:
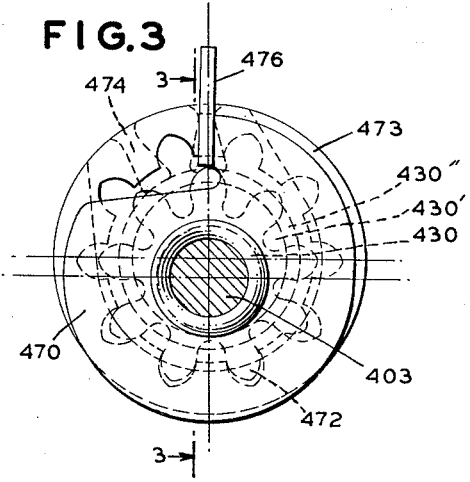
FIG. 3 is an enlarged right side elevation of an accumulator assembly in which a zero stop lug thereof is shown in line with the major axis of the eccentric bearing and in position for coupling engagement with an accumulator wheel slot extending along said axis.
Figure 4:
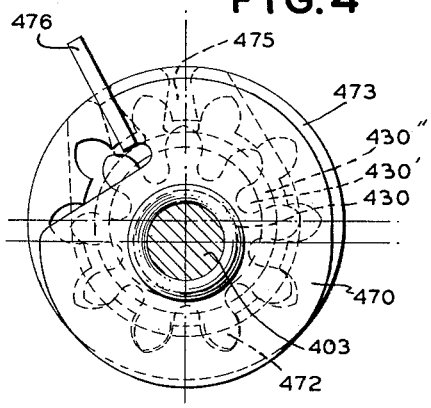
FIG. 4 is a similar view but showing a zero stop lug displaced from said axis to an alternative setting, and in position for coupling engagement within a second slot of the accumulator wheel.

The totalizer wheels 473 are each provided with two radial slots numbered 474, 475 respectively which are adapted selectively to receive, as hereinafter described, a lateral projection 476 of the disc 470, whereby to couple the adjacent higher order eccentric 430' for operation by the wheel 473 of lower order and effect a "crawl" tens carry operation. Since no carrying ever takes place in the units order however the projection 476 for this order is held from rotation by a suitable fixed member 477 (FIG. 2) secured to the machine framing.

In the tens carry operation, the eccentric of the units order being held stationary, the units actuator will rotate its actuator gear 472 and the units totalizer wheel gear 473, and the latter having made one complete rotation will through the coupling engagement of projection 476 of the tens order with one or the other of slots 474, 475 in the units order wheel 473 rotate the hub 430 and thereby eccentric 430' of the tens order in a circular path the radius of which is the degree of eccentricity of the eccentric 430' of the tens order one step of movement to effect the carry. With this explanation the operation of the tens transfer devices from order to order will be obvious. It will be noted however that the wheel-to-wheel coupling means of the present invention include a projection 476 which is adapted for a concentric operation around the register shaft 403 and that said projection is utilized also as a zero control lug cooperating with certain total hook levers when a zeroizing of any register is effected during a total taking operation, as in the following manner.

As more fully set forth in the patents of reference, in taking a total or a subtotal, the corresponding key being depressed, the actuator levers 610 will be released one after another from right to left of the machine, each actuator lever being driven by its spring to rotate the related totalizer wheel in a subtractive direction. Released successively so as to fall into the path of movement of zero stop lugs, identified in the patent as 471" fast to the eccentrically mounted numeral wheels, but which in the present application include the coupling projection 476 fast to the concentrically bearinged disc 470, are total hook levers 613—613' (shown as a single lever 613 in the patent) each provided with a plurality of hook-shaped projections 613a—613b respectively for cooperation with the said zero stop lugs 476 on related ones of a plurality of register units.

To reduce maximum movement of the total hooks where additional registers are provided it is known heretofore to make such total hook levers in the form of a compound or two-part lever having separate pivot centers 618, 619, as shown by the parts 613, 613' of FIG. 6 in the present application. However, such arrangement requires that the zero lugs on any registers controlled by the levers 613 will be secured at a different circumferentially indexed position in relation to the tens carry eccentric 430' to the position as required for the zero lugs on the registers controlled by the levers 613'; in order to obtain therefor an accepted mechanical cooperation thereof in relation to the respective pivot centers for the said levers.

Thus heretofore, whether the zero lugs are riveted to the accumulator gear wheel, as in the patent, or are made integral therewith an entirely different set of work fixtures is required in the manufacturing operation for the registers associated with the levers 613 to the work fixtures as required for the registers associated with the levers 613', and this has added considerably to the cost of manufacture. Also such arrangement of the parts requiring certain accumulator wheels to be constructed different to that of other accumulator wheels makes the parts of any accumulator wheel assembly susceptible to being inadvertently misassembled, in that a wrong accumulator wheel may be used in the assembly.

For the devices of the present invention all of the parts of any accumulator wheel assembly are constructed to be the same and so are interchangeable with each other. The accumulator gear wheel is made preferably as a single molded part from nylon or similar material and includes the two radial slots 474, 475 to which reference is made earlier in the specification.

An accumulator wheel is now mounted for rotation directly upon its related eccentric 430', in lieu of being riveted to a support plate as heretofore, and a pinion gear 472 is meshed with the internal teeth thereof, for rotation therewith upon the concentric hub 430. A coupling member 476 is thereafter spun fast upon the shoulder portion of said hub for retaining the parts thereon. Accordingly, for the purpose above set forth, since coupling members 476 now serve also as a zero lug for the respective accumulator wheels and said wheels for certain of the registers cooperate with limit stops 613a on total hook levers 613 which are pivoted about different centers to the pivotal center for the levers 613' carrying limit stops 613b related to other ones of the registers, the said coupling members 476 on any registers related to levers 613 are spun upon their eccentric in a different angular relation therewith to that required for the coupling members 476 with relation to their respective eccentrics for any registers related to the levers 613'.

In the devices of the present invention however the accumulator wheels 473 are made universal to the requirement of all the registers by the provision of slots 474, 475 therein, earlier set forth. The slot 475 is adapted for coupling engagement with the adjacent higher order coupler 476 of the register related to the total hooks 613, while slot 474 similarly provides coupling engagement with coupler 476 in respect to the accumulator wheels for any registers related to the total hook levers 613'.

From the above description therefore and with particular reference to the illustration shown in FIG. 6 it will be obvious that with the stop lugs 473 of the present devices made fast with the respective eccentrics 430' any lost motion such as occurs heretofore between stop lugs 476 and the corresponding eccentrics 430' is now eliminated. Thus upon an engagement of any stop lug 476 with its related total hook 613—613' the major axis of the eccentrics is brought into an accurate alignment with respect to a line 478 extending radially to the pivot center 608 for the register actuators 610 (FIG. 1) and the respective register shafts 403. Also, since zero stop lugs 476 are now mounted for a concentric movement around shaft 403 the said stop lugs are now adapted to be maintained to a uniform and accurate alignment with respect to said line 478; so that, with any accumulator at zero registering position the total hooks, as successively released in a total taking operation, are always free to move into effective position for subsequent engagement therewith.

The above being in contradistinction to the heretofore known devices wherein the zero stops are fast to accumulator wheels mounted upon eccentrically displaced bearings which thereby in displacing the accumulator wheel pivot centers will move the stop lugs bodily toward or away from the respective pivot centers 618, 619 for the cooperating total hook levers 613—613'; so that, said levers when released to fall successively in totalizing operations are apt to become hung up on the peripheral edge of the zero lugs and thus cause a misregistration to be effected.

It will be noted that the accumulator wheel 473 as now mounted for rotation directly upon the eccentric portion 430' of hub 430, in lieu of being riveted, as heretofore, to a separate plate for mounting thereon has eliminated the chance of off proper center riveting of any wheel upon its support plate. Thus a more close fit in the mesh of the internal gear teeth of said wheels with their actuator gears is now permitted and loss motion within the register parts to that of the earlier known devices is thereby considerably reduced.

Although specific embodiments of the invention have been described herein, it is not intended to limit the invention solely thereto, but to include all of the obvious variations and modifications within the spirit and scope of the appended claims.

We claim:
1. In a business machine having a plurality of registers including a series of accumulator wheels, actuator gears therefor, differentially moveable actuators having gear segments adapted for engagement with said actuator gears, crawl carry tens transfer devices between said series of accumulator wheels comprising actuator gears, a concentrically rotatable hub upon which the related actuator gear is rotatably mounted, said hub having an eccentric for rotation therewith, a floating gear constituted by an accumulator wheel of unitary structure rotatably mounted upon said eccentric and having internal teeth meshing with the related actuator gear, the number of teeth of the actuator gear and the accumulator wheel gear having a ratio of nine to ten, and coupling means between the accumulator wheel gear of lower order and the hub of the eccentric related to the accumulator wheel gear of next higher order; and wherein said coupling means comprises within the accumulator wheel a plurality of radial slots, and a coupling member combined with zero stop means secured to said hub for concentric rotation therewith, and whereby the said coupling member is adapted to be engaged selectively with one or the other of said slots in an adjacent lower order accumulator wheel.

2. The invention according to claim 1 and wherein the said combination zero stop coupling members extend beyond the combination zero stop periphery of the accumulator wheels whereby to constitute a concentrically operated stop element adapted for stopping a related accumulator wheel at zero registering position, and to concurrently therewith stop the eccentric mounting for an adjacent higher order wheel at a given accurate position and free of loose motion.

3. The invention according to claim 2 and wherein the combination zero stop coupling members for accumulator wheels comprising certain register of the machine are secured to their hubs in a different angular relation with respect to their supporting eccentrics to that of the angular relation of other coupling members as secured to their hubs in relation to the supporting eccentrics for the accumulator wheels comprising other registers in the machine.

4. The invention according to claim 2 and wherein the combination zero stop coupling members for the accumulator wheels corresponding to certain ones of the registers of the machine are secured to their respective concentric hubs in line with the major axis of the related eccentrics, and wherein the zero stops for the accumulator wheels corresponding to other ones of the registers are secured to their respective hubs in a radially displaced position relative to the major axis of the associated eccentrics.

5. In a business machine having a series of accumulator wheels, actuator gears, differentially moveable actuators engageable with said gears, crawl carry transfer devices between said series of accumulator wheels comprising actuator gears, a concentrically rotatable hub upon which the related actuator gear is rotatably mounted, said hub having an eccentric for rotation therewith, a floating gear constituted by an accumulator formed as a single structure wheel rotatably mounted upon said eccentric and having internal teeth meshing with the related actuator gear, and wherein the said accumulator wheels include a radial slot, a coupling member secured to the said hub for concentric rotation therewith, and wherein said coupling member has slideable engagement with the slot in an adjacent lower order numeral wheel, and wherein said coupling member extends beyond the periphery of the accumulator wheel whereby to constitute a concentrically operated zero stop element adapted for stopping an operation of said wheel while concurrently stopping the adjacent higher order eccentric.

6. For a lister calculating machine the combination of a plurality of registers including a series of accumulator wheels, actuator gears therefor, and a plurality of gear segments adapted for engaging the said actuator gears of any selected ones of said registers, crawl carry tens transfer devices between said series of accumulator wheels comprising actuator gears, a concentrically rotatable hub upon which the related actuator gear is rotatably mounted, said hub having an eccentric portion rotatable therewith, a floating gear constituted by an accumulator wheel comprising a single structure member rotatably mounted upon the related eccentrics and having internal teeth meshing with the related actuator gear, the number of teeth of the actuator gear and the floating accumulator wheel gear having a ratio of nine to ten, and wherein the accumulator wheels each include a pair of radial slots therein, a coupling member fast to the hubs of related ones of said eccentrics, and adapted to be engaged selectively with one or the other of said slots in an adjacent lower order accumulator wheel, and wherein said coupling member comprises also an element fast with said hub and adapted for stopping operations of the corresponding eccentric portions accurately at a given position and free of any loss motion.

7. In a listing calculator the combination of a plurality of registers including a series of totalizer wheels and actuator gears therefor, differentially moveable actuators comprising gear segments, engageable with the said actuator gears for selective ones of said registers; total taking levers having stops adapted for interrupting operations of any totalizer wheel at zero registering position, including a first lever displaceable to active stop condition with respect to the totalizer wheels of certain ones of said registers and a lever having different pivot centers than the first said lever and displaceable for interrupting operations of other selected ones of said registers; crawl carry transfer devices between the series of totalizer wheels for the respective registers, comprising actuator gears, a concentrically rotatable hub upon which the related actuator gear is rotatably mounted, said hub having an eccentric for rotation therewith, a floating gear constituted by a single part totalizer wheel mounted for rotation upon said eccentric and having internal teeth meshing with the related actuator gear, a combination zero stop and coupling member fast with related ones of said hubs for concentric rotation therewith, and wherein said coupling includes an elongated projection extending beyond the peripheral diameter of the totalizer wheel, and wherein the said couplings for the totalizer wheels associated with the first said levers extend along a line of the major axis for the associated eccentrics, and wherein the said couplings for the totalizer wheels associated with the second said levers are secured to their respective hubs in a position radially displaced to the line of major axis for their eccentric; and wherein the totalizer wheels include a plurality of slots therein adapted for selective engagement with an adjacent higher order coupling member, and in which cooperation of any said member with an associated stop on either one of said levers will stop a lower order totalizer wheel at zero registering position while stopping free of lost motion the eccentric for an adjacent higher order wheel with its major axis along a line radial to the pivot center for the differentially moveable actuators and the cooperating actuator gears for said totalizer wheel.

References Cited in the file of this patent
UNITED STATES PATENTS
2,450,787     Fleming _____ Oct. 5, 1948

UNITED STATES PATENT OFFICE
CERTIFICATE OF CORRECTION

Patent No. 3,051,385　　　　　　　　　　　　　　August 28, 1962

Douglas C. Durgin et al.

It is hereby certified that error appears in the above numbered patent requiring correction and that the said Letters Patent should read as corrected below.

Column 1, line 14, for "1958" read -- 1948 --; line 15, for "accumulaotr" read -- accumulator --; column 6, line 29, strike out "combination zero stop"; line 38, for "register" read -- registers --.

Signed and sealed this 3rd day of September 1963.

(SEAL)
Attest:

ERNEST W. SWIDER
Attesting Officer

DAVID L. LADD
Commissioner of Patents